(12) United States Patent
Yan

(10) Patent No.: US 6,243,210 B1
(45) Date of Patent: *Jun. 5, 2001

(54) OPTICAL IMAGE ROTATING DEVICE USED WITH AFOCAL IMAGE RELAYING OPTICS AND LASER DIODE ARRAY

(75) Inventor: Yu Yan, Binghamton, NY (US)

(73) Assignee: Semiconductor Laser International Corp., Binghamton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/257,540

(22) Filed: Feb. 24, 1999

(51) Int. Cl.[7] .................................................. G02B 27/30
(52) U.S. Cl. ..................... 359/641; 359/618; 359/619; 359/629
(58) Field of Search .................................. 359/618, 619, 359/629, 641

(56) References Cited

U.S. PATENT DOCUMENTS 4,969,137 * 11/1990 Sugiyama et al. ............... 369/32
5,168,401    12/1992 Endriz .
5,513,201     4/1996 Yamaguchi et al. .
5,532,730 *  7/1996 Akanabe ............................. 347/259
5,579,161 * 11/1996 Sekiguchi ........................... 359/559
5,850,307 * 12/1998 Straayer ............................. 359/209

* cited by examiner

Primary Examiner—Scott J. Sugarman
Assistant Examiner—Tim Thompson
(74) Attorney, Agent, or Firm—Hugh D. Jaeger

(57) ABSTRACT

A new optical image rotating device, used in combination with laser diode bars or laser diode bar arrays, cylindrical lens elements or cylindrical lens element arrays, and an afocal image relay system, to achieve a highly collimated output laser beam suitable for use in many applications. Due to the simplicity of the optical image rotating device, fabrication of such a device is relatively easy and straightforward. The optical image rotation device is suitable for use with high-density laser diode bars, as well as continuous linear and 2D sources. Performance of the system is relatively insensitive to alignment of the optical image rotation device.

2 Claims, 23 Drawing Sheets

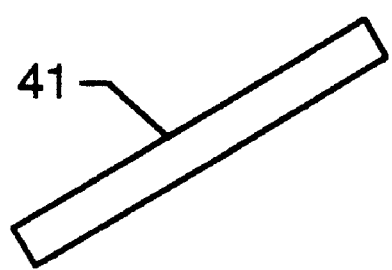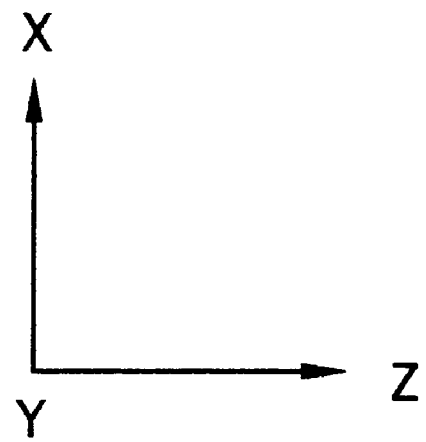
FIG. 7c

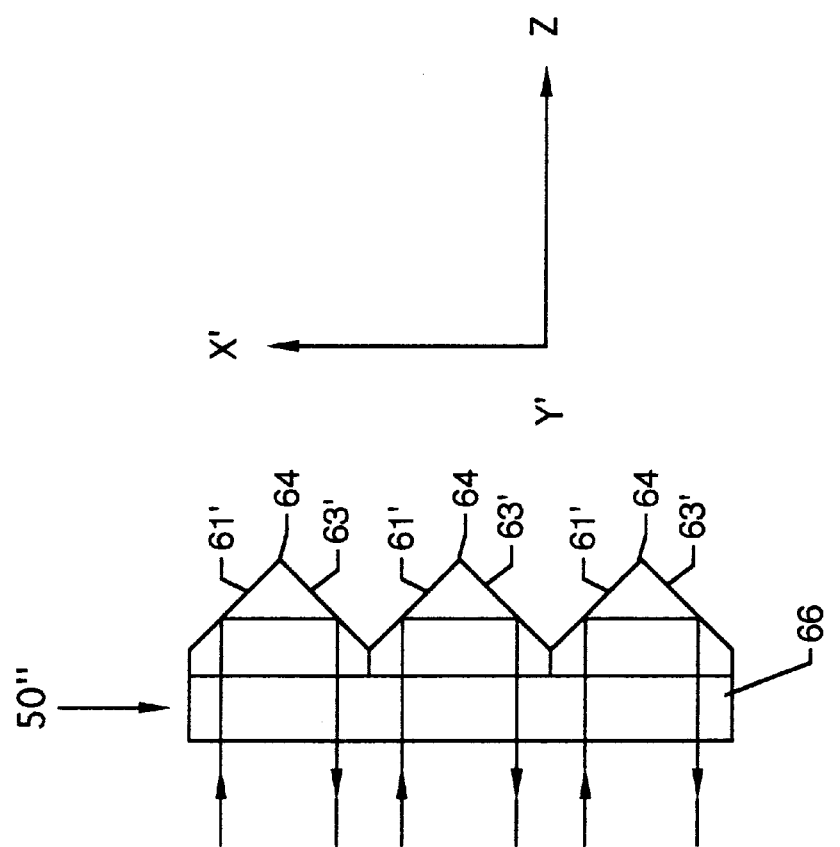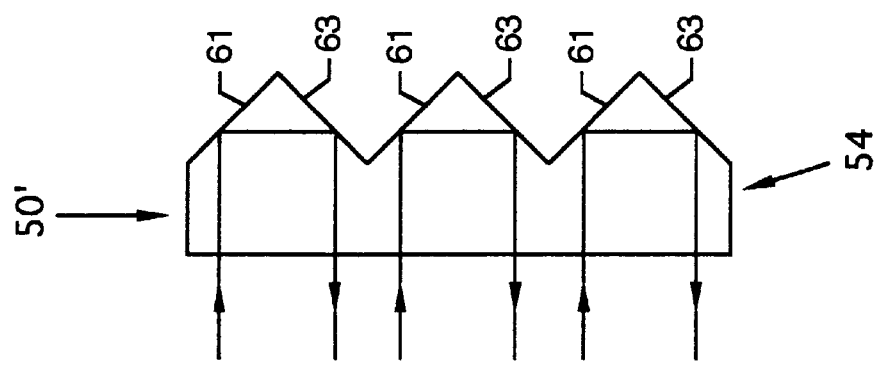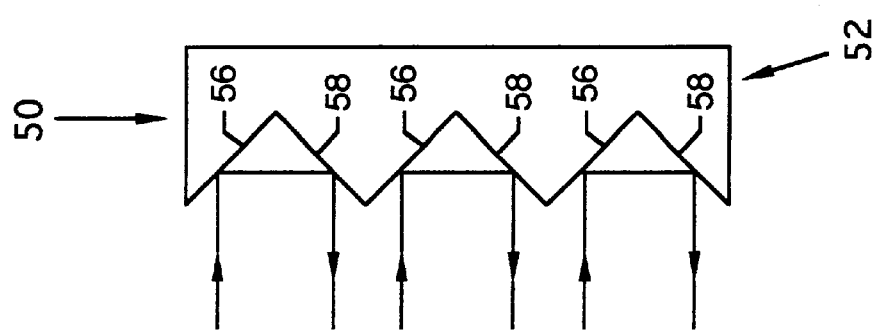

OPTICAL IMAGE ROTATING DEVICE USED WITH AFOCAL IMAGE RELAYING OPTICS AND LASER DIODE ARRAY

BACKGROUND OF THE INVENTION

1. Field of the Invention

This invention relates to the general field of semiconductor laser systems using diode bars and stacked diode bars, providing high-brightness beams, used in applications such as pumping of solid-state lasers, materials processing and medical applications. Specifically, this invention relates to an optical image rotation device, and the associated laser and optical systems.

2. Description of the Prior Art

Various systems previously designed to modify the bi-lateral divergence of laser diodes and laser diode arrays use sequential image rotation devices, which depend on a specific and predetermined order of reflective surfaces. Specifically, each laser diode image is rotated by an individual and specific series of optical elements. Examples of these optical elements include prisms, external reflectors and lenses. Due to the relatively small spacing between individual diode emitters, and the subsequent relatively small spacing between subsequent adjacent beampaths, the aforementioned optical elements are relatively small, and generally assembled in an array of size on the scale of the laser diode array. Fabrication and assembly of such arrays of optical elements is relatively complex, as compared to the use of a single lens element. Careful alignment of such an optical element array must be performed to achieve optimal performance of the system as a whole. In U.S. Pat. No. 5,513,201, "Optical Path Rotating Device Used With Linear Array Laser Diode And Laser Apparatus Applied Therewith", several externally and internally reflective array designs are presented, all of which require careful one-to-one alignment with the laser diode array.

SUMMARY OF THE INVENTION

The present invention provides a new optical image rotating device, used in combination with laser diode bars or laser diode bar arrays, cylindrical lens elements or cylindrical lens element arrays, and an afocal image relay system, to achieve a highly collimated output laser beam suitable for use in many applications.

The optical image rotating device comprises a plurality of pairs of perpendicular reflective surfaces. This device may be a mirror array, prism array, or a plurality of prisms. The working surfaces of the optical image rotating device are perpendicular to a common plane, so that fabrication of the optical image rotation device is relatively easy and straightforward. The optical image rotation device is suitable for use with high density laser diode bars, as well as continuous linear and 2D sources. Performance of the system is relatively insensitive to alignment of the optical image rotation device.

In the first embodiment, semiconductor laser sources, comprising a laser diode bar having arranged linearly therein 10 to 100 active layer stripes, are collimated in the fast axis by a single cylindrical lens element. An afocal image relaying optical system then reimages the laser diode bar through a polarizing beamsplitter onto the optical image rotating device. The optical image rotating device rotates the image, and therefore the associated polarization, 90 degrees around the Z-axis. The optical image rotating device reflects and redirects the radiation back towards the polarizing beamsplitter. The polarizing beamsplitter reflects and redirects the beam in a direction substantially different from the incident beam. A single cylindrical lens subsequently collimates the beam in the slow axis. The laser diode bar radiation is therefore brought to a high degree of collimation, and can be readily used in many applications.

In the second embodiment, semiconductor laser sources, comprising a stack of laser diode bars having arranged linearly therein 10 to 100 active layer stripes, are collimated in the fact axis by a stack of cylindrical lens elements. An afocal image relaying optical system then reimages the stack of laser diode bars, through a polarizing beamsplitter, onto the optical image rotating device. The optical image rotating device rotates the image, and therefore the associated polarization, 90 degrees around the Z-axis. The optical image rotating device reflects and redirects the radiation back towards the polarizing beamsplitter. The polarizing beamsplitter reflects and redirects the beam in a direction substantially different from the incident beam. A stack of cylindrical lens elements subsequently collimates the beam in the slow axis. The radiation from the stack of laser diode bars is, therefore, brought to a high degree of collimation, and can be readily used in many applications.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 7*a*, 7*b*, 7*c* and 7*d* show top and side views, respectively, of two embodiments of the polarizing beamsplitter element;

FIGS. 8*a*, 8*b* and 8*c* shown the cross section (in the X-Z plane) of an alternate optical image rotating device for use in the present invention;

DETAILED DESCRIPTION OF THE PREFERRED EMBODIMENTS

Figure 1:
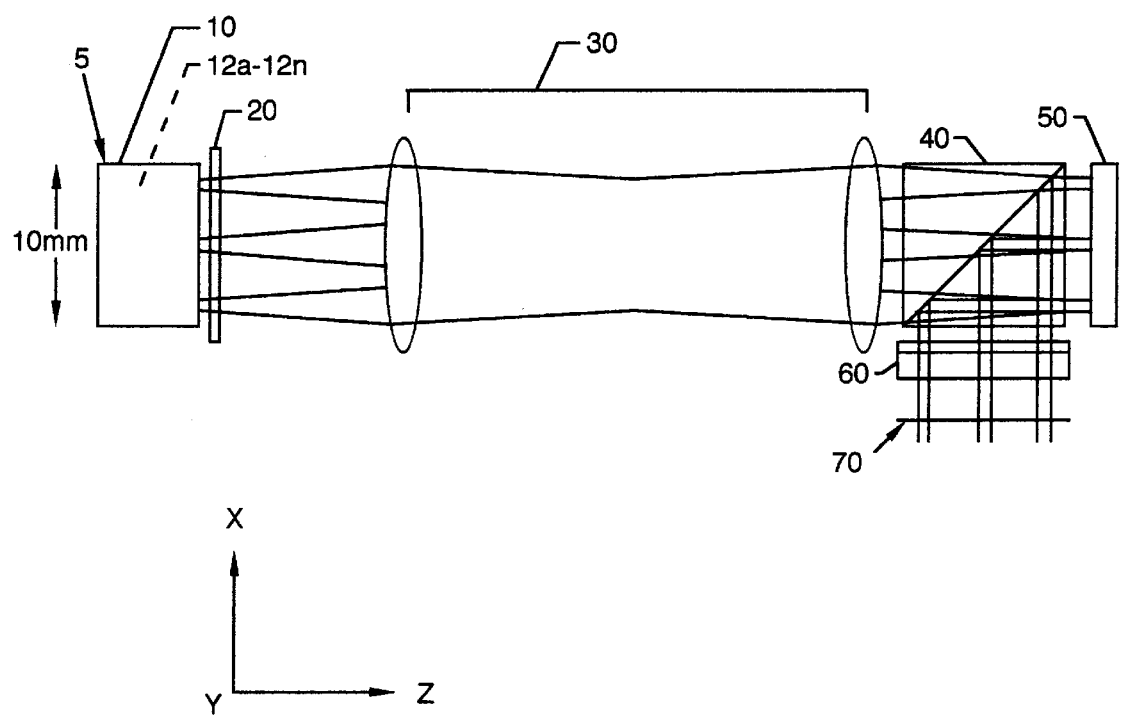
FIG. 1 is a plan view of the preferred embodiment of the invention.
Figure 2A:
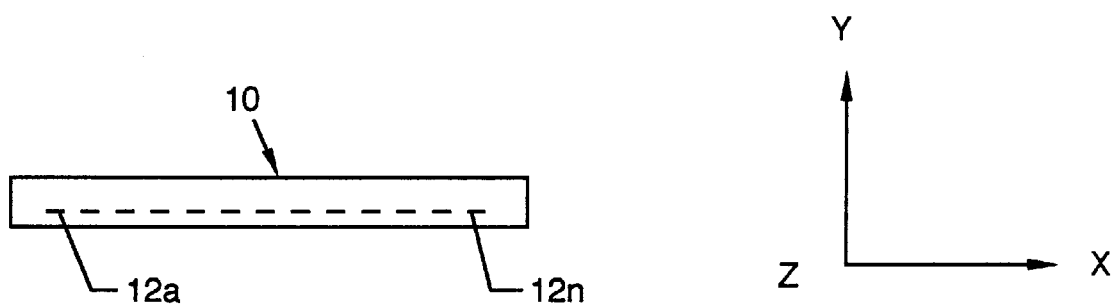
FIGS. 2*a* and 2*b* are, respectively, schematic diagrams of the laser diode bar and stacked laser diode bars.

FIG. 1 is a plan view of the semiconductor laser system of the present invention. The light source 5 is a laser diode bar or stack of laser diode bars 10. Each bar 10, for example, is 10 mm long, comprising 10 to 100 individual laser diode emitters 12a–12n, as also shown in FIG. 2a. The cross section of each emitter 12a–12n is 0.1 to 1 um in the Y-axis, and 50 to 200 um in the X-axis. The angular divergence in the Y-Z plane (also referred to as the "fast axis") is 30 to 50 degrees FWHM. The angular divergence in the X-Y plane (also referred to as the "slow axis") is approximately 10 degrees FWHM.

The cylindrical lens element 20 collimates the radiation from the laser diode bar(s) 10 in the fast axis.

An image relay system 30 projects an image of the laser diode bar(s) 10 onto the optical image rotation device 50. The image relay system 30 is telocentric in both object and image space, and is afocal.

A polarizing beamsplitter element 40 is located following the image relay system 30. Polarizing beamsplitter element 40 is oriented such that the radiation emanating from the image relay system 30 transmits through the polarizing beamsplitter element 40.

The optical image rotation device 50 rotates the images of individual diode emitters 12a–12n 90 degrees around multiple axes which are parallel to the Z-axis. Taking as an example, the image of one of specific diode emitter 12a–12n is rotated 90 degrees around a Z'-axis; the Z'-axis being parallel to the Z-axis, and located approximately at the location of the specific diode emitter 12a–12n. Thus, the 90 degree image rotations of the individual diode emitters 12a–12n occur around approximately their individual locations, while the relative arrangement of the laser diode emitters 12a–12n within the array of laser diodes 10 remains unchanged. The images of each emitter 12a–12n, and therefore the polarization, are rotated 90 degrees and redirected back towards the polarizing beamsplitter element 40.

The polarizing beamsplitter element 40 is oriented such that the radiation emanating from the optical image rotation device 50 reflects from the polarizing beamsplitter element 40, and is redirected in direction substantially different from the image relay system 30.

The cylindrical lens 60 element collimates the radiation from the laser diode bar(s) 10 in the slow axis.

The radiation in the XY plane at location 70 is collimated in both fast and slow axis, and can be subsequently used in a number of applications.

Figure 2B:
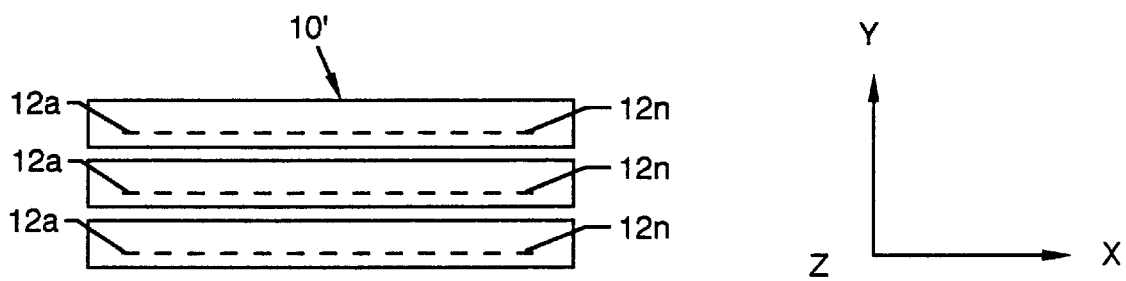

FIGS. 2a and 2b show, respectively, the laser diode bar 10 and stacked laser diode bars 10'. For simplicity, only eight emitters 12a–12n on laser diode bar(s) 10 and 10' are shown and only eight emitters 12a–12n are shown on each of the stacked laser diode bars 10'.

Figure 3A:
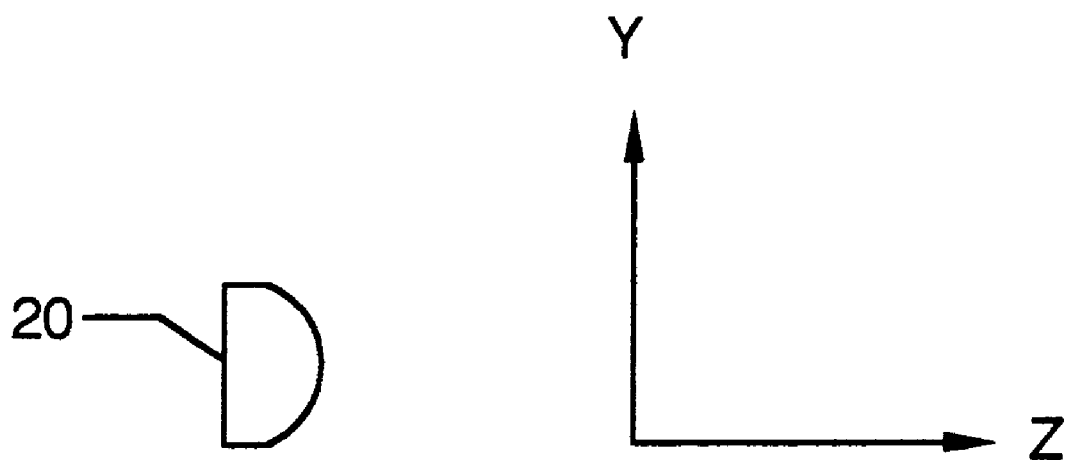
FIGS. 3*a*, 3*b*, 3*c* and 3*d* show side and top views, respectively, of the cylindrical lens and cylindrical lens array which collimate the radiation in the fast axis for the laser diode and stacked laser diode bars.
Figure 3B:
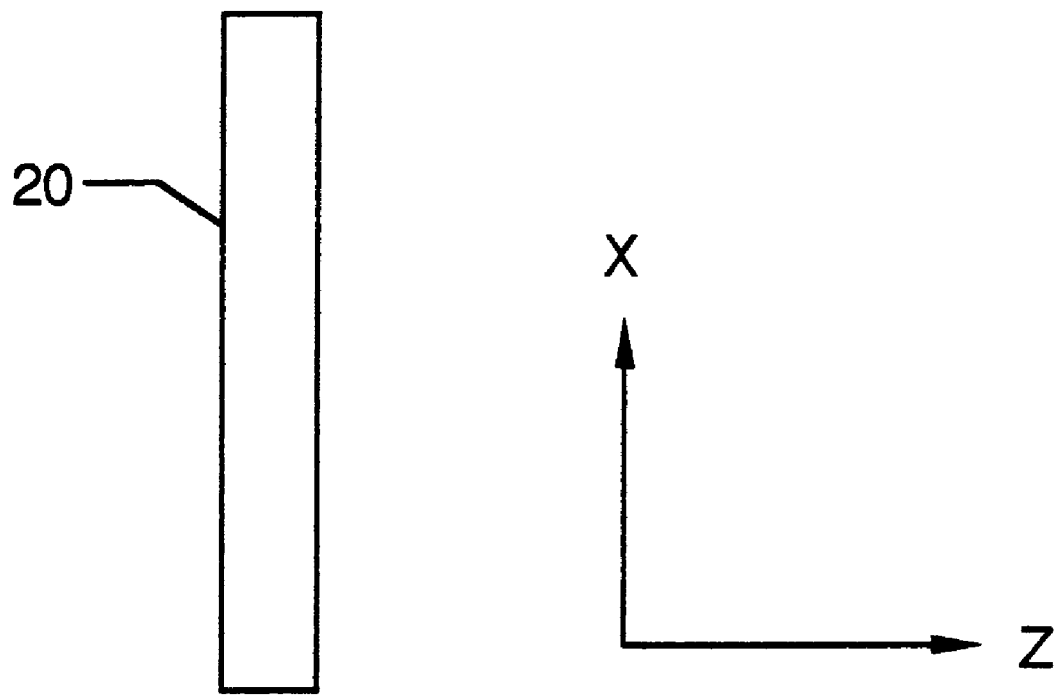

FIG. 3a illustrates an end view of cylindrical lens element 20 and FIG. 3b illustrates a top view of the cylindrical lens element 20, which collimate the radiation in the fast axis, where all numerals correspond to those elements previously or otherwise described.

Figure 3C:
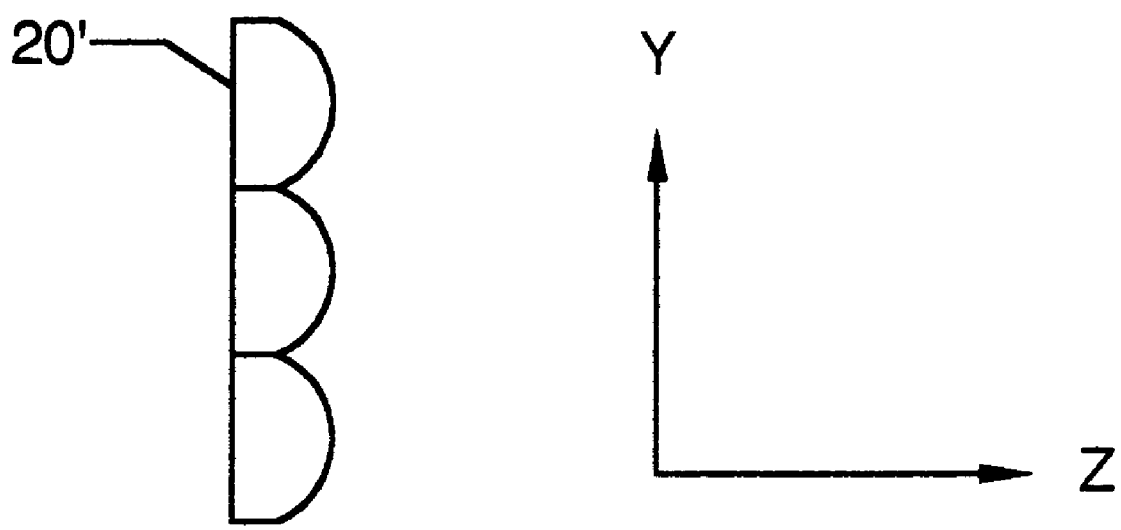
Figure 3D:
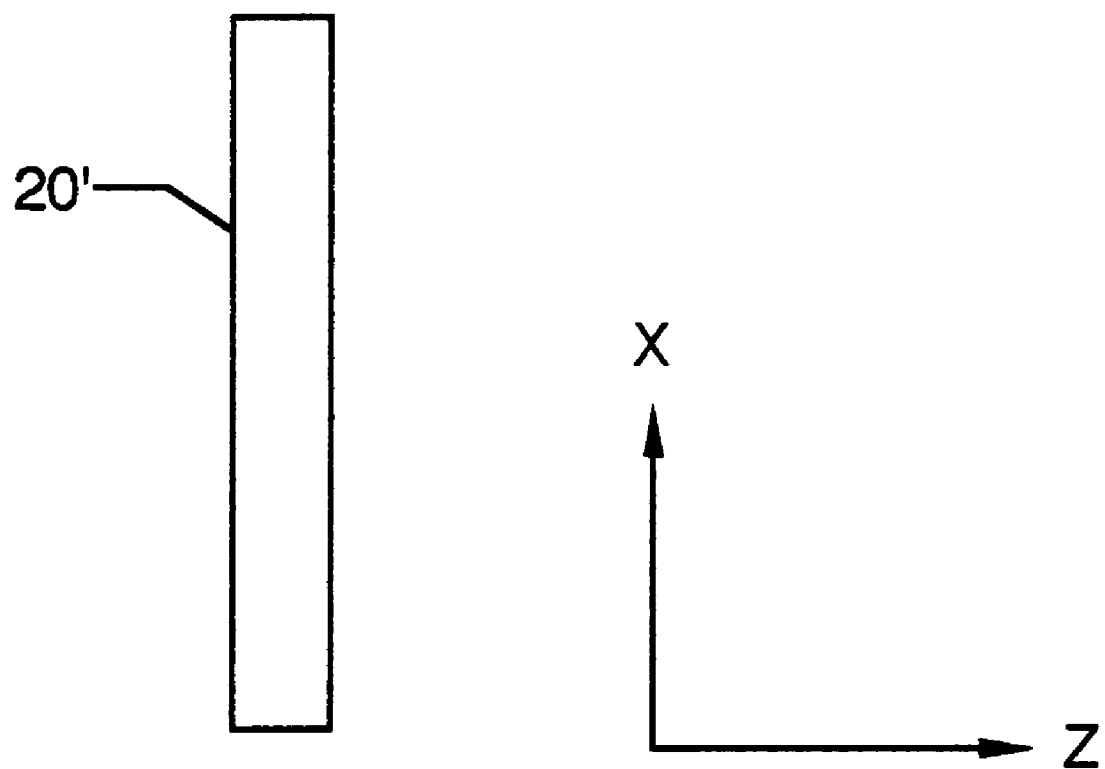

FIG. 3c illustrates an end view of a cylindrical lens array element 20' and FIG. 3d illustrates a top view of the cylindrical lens array element 20', which collimate the radiation in the fast axis.

Figure 4A:
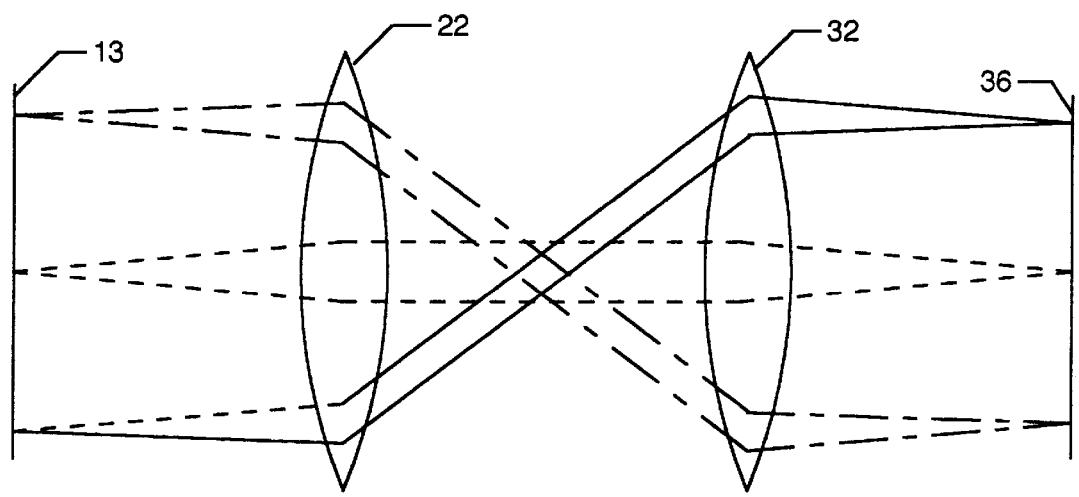
FIGS. 4*a*, 4*b* and 4*c* show three examples of afocal doubly telocentric imaging systems.
Figure 4B:
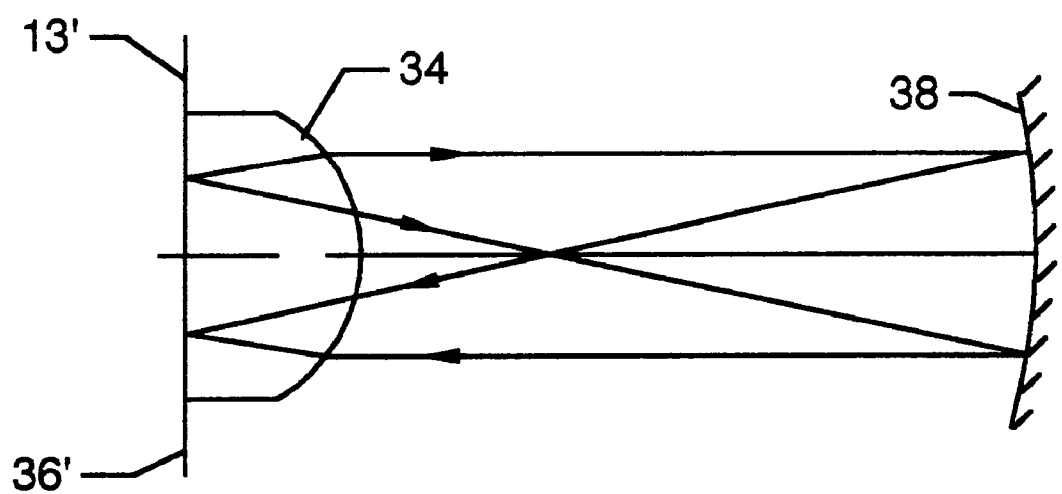

Shown in FIGS. 4a and 4b are two examples of afocal doubly telocentric imaging systems, where all numerals correspond to those elements previously or otherwise described. FIG. 4a is one embodiment, using tow positive lens group 22 and 32 (see, for example, Kingslake, Lens Design Fundamentals, Academic Press, 1978). Radiation from the object plane 13 is imaged by two positive lens groups 22 and 32, respectively, and focused on the image plane 36.

A second embodiment, shown in FIG. 4b, is a catadioptric Dyson system described in the articles: J. Dyson, "Unit magnification optical system without Seidel aberrations", Journal of the Optical Society of America, Vol. 49(7), 713–716, 1959 and C. G. Wynne, "A unit-power telescope for projection copying", Optical Instruments and Techniques, Oriel Press, 429–434, 1970. The Dyson system includes a concave mirror 38 of radius of curvature R and a lens 34 with one surface convex of radius r and the other flat which lies in the center of curvature of the convex surface. The radii are connected by the relationship $R/r=n/(n-1)$, where n is the index of the lens 34. If the object is 13', the image is 36' at the same distance from the axis as the object.

Figure 4C:
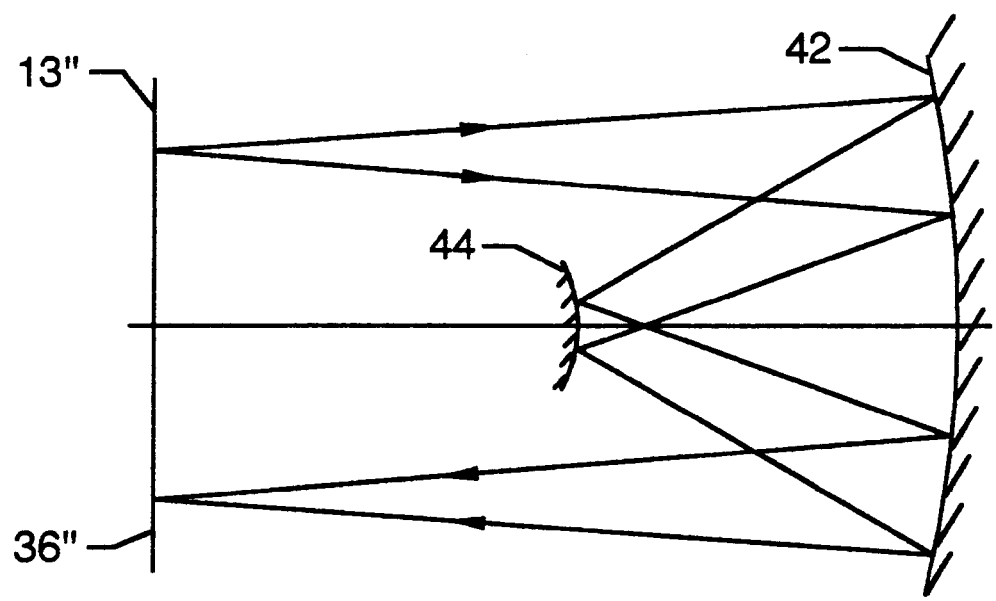

The third embodiment, shown in FIG. 4c, is a reflective Offner system described in U.S. Pat. No. 3,748,015, 07/1973. The Offner system includes a primary mirror 42 and a secondary mirror 44. The radius of curvature of the secondary mirror 44 is half that of the primary mirror 42. The object plane 13" and the image plane 36" are in a vertical plane through the concentric point of the two mirrors 42 and 44.

Figure 5:
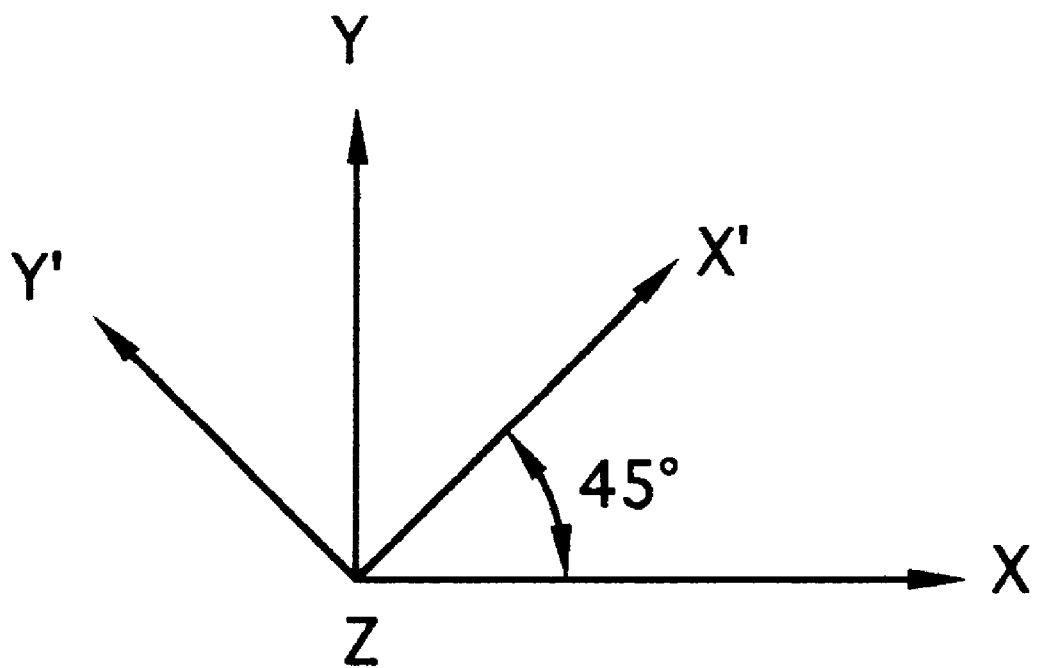
FIG. 5 shows the relationship of orientation between the laser diode bar and the optical image rotating device.

FIG. 5 shows the relationship of orientation between the laser diode bar 10 and the optical image rotation device 50, where all numerals correspond to those elements previously or otherwise described. The laser diode bar 10 is aligned with the emitter height and width parallel to the X- and Y-axes. The optical image rotation device 50 has its fold axes parallel to the X-axis, which is rotated 45 degrees from the X-axis.

Figure 6:
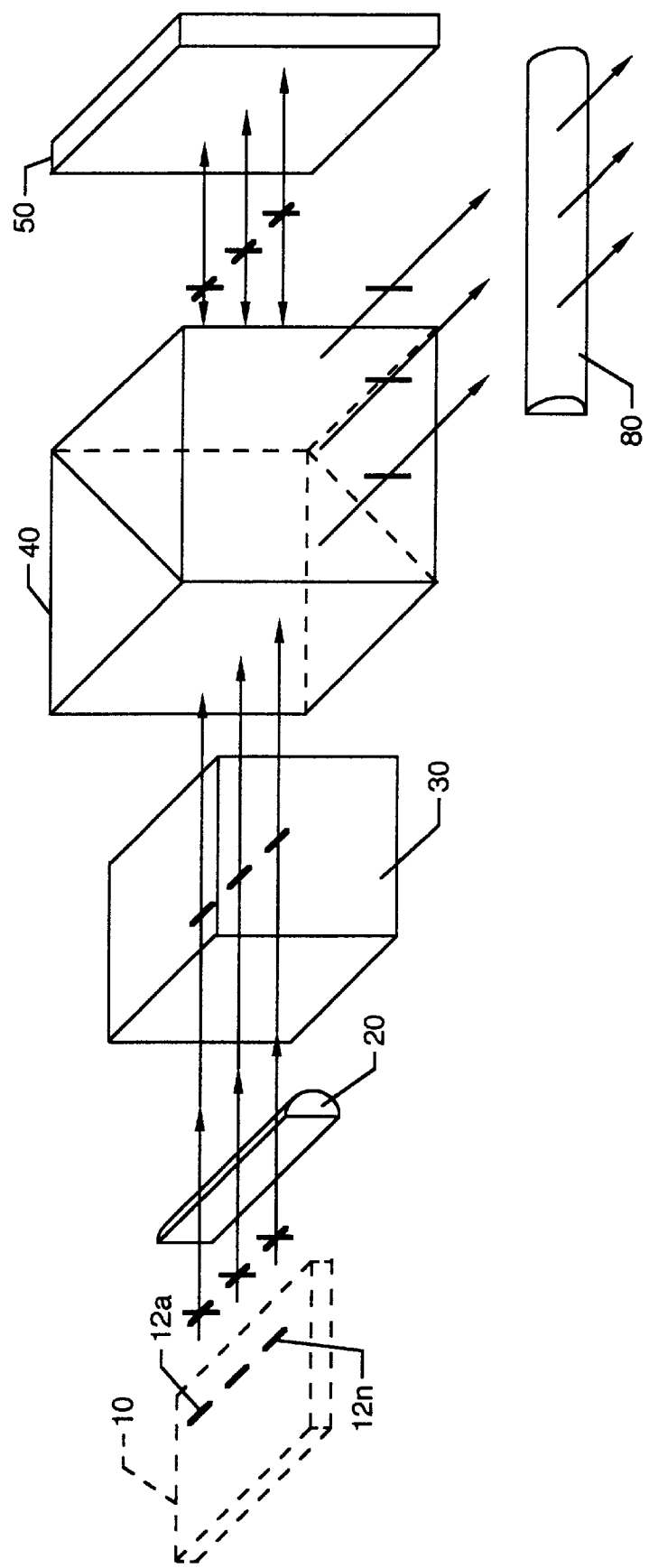
FIG. 6 shows the combined action of the collimating lenses of the polarizing beamsplitter element and the optical image rotation device.

FIG. 6 illustrates the combined action of the polarizing beamsplitter element 40 and the optical image rotation device 50, where all numerals correspond to those elements previously or otherwise described. Shown for example is an image and polarization parallel to the X-axis which enters and transmits through the polarizing beamsplitter element 40. The optical image rotation device 50 rotates the image and polarization by 90 degrees, such that both image and polarization are parallel to the Y-axis. The radiation subsequently reflects off the polarizing beamsplitter element 40, and is redirected in a different direction.

Figure 7A:
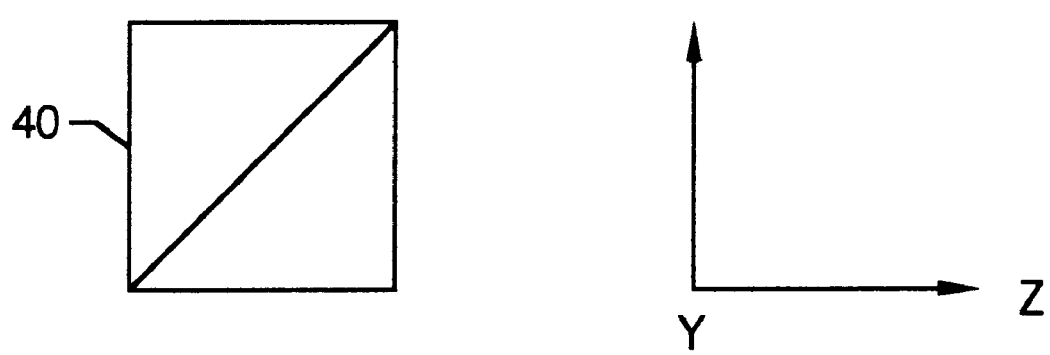
Figure 7B:
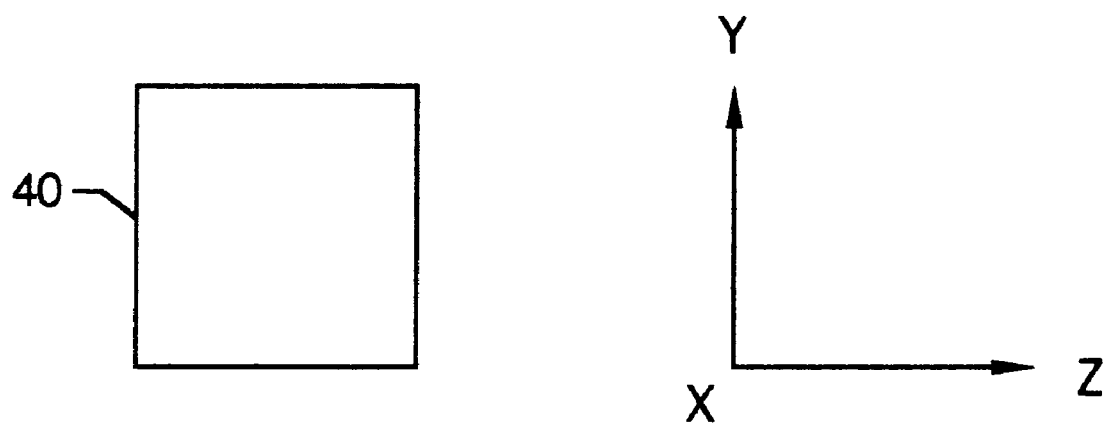

FIGS. 7a and 7b illustrate a top view and a side view of the cube beamsplitter element 40, respectively. This element may be a cube beamsplitter, shown in FIG. 6, or, in the alternative, can be a polarizing plate beamsplitter.

Figure 7D:
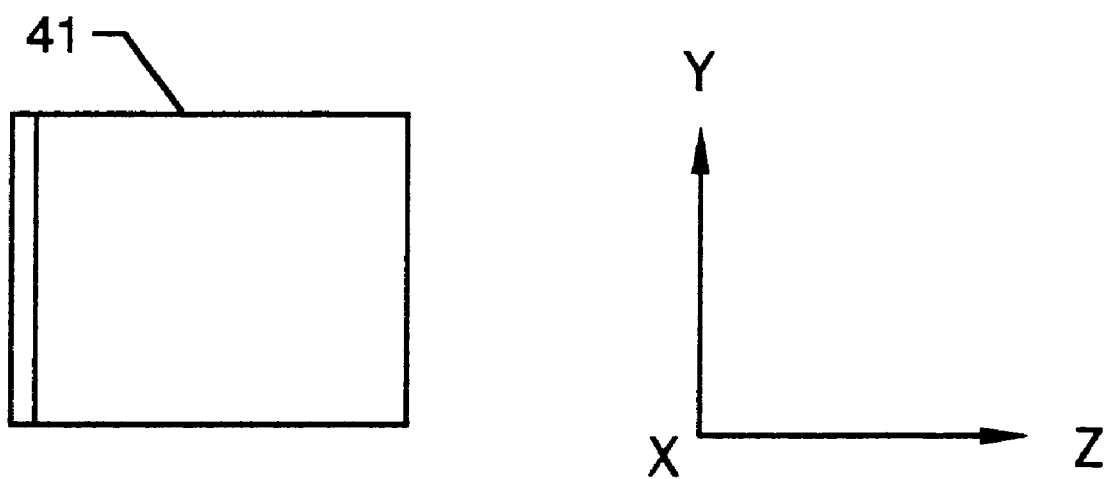

FIGS. 7c and 7d illustrate a top view and a side view of a polarizing plate beamsplitter 41.

FIGS. 8a, 8b and 8c show the cross section (in the X-Y plane) of alternative optical image rotation devices 50 in the present invention. The optical image rotation device 50 may be a mirror array 52, comprising plurality of a pair of reflective surfaces 56 and 58, which are perpendicular to each other. Alternatively, the optical image rotation device 50' may be a prism array 54, comprising a plurality of a pair of total internal reflection surfaces 61 and 63, which are perpendicular to each other. An additional alternative embodiment includes a prism array 65 which can be an optical image rotation device 50" formed by a substrate 66 and a plurality of prisms 64, comprising a plurality of a pair of total internal reflection surfaces 61 and 63, which are perpendicular to each other.

Figure 9A:
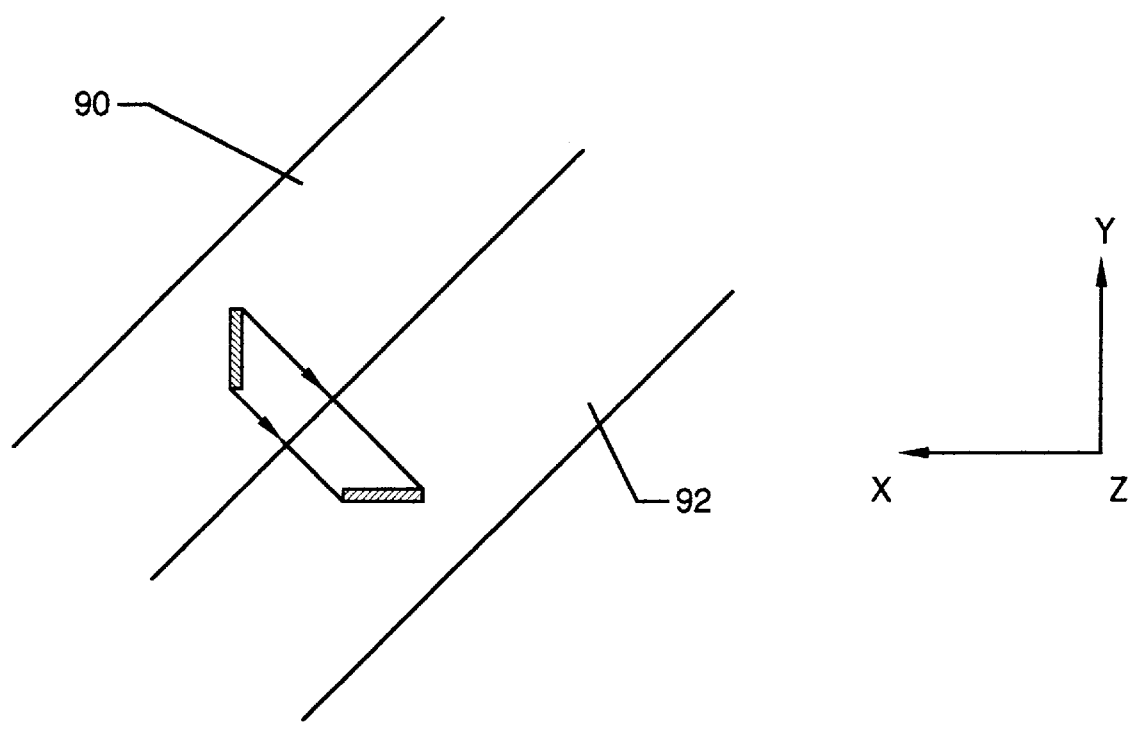
FIG. 9*a* and 9*b* shows, in literal form, the image rotation performed by the image rotating device; and, FIGS. 10*a*, 10*b*, 10*c* and 10*d* show, respectively, the cylindrical lens element and cylindrical lens element array which collimate the radiation in the slow axis.
Figure 9B:
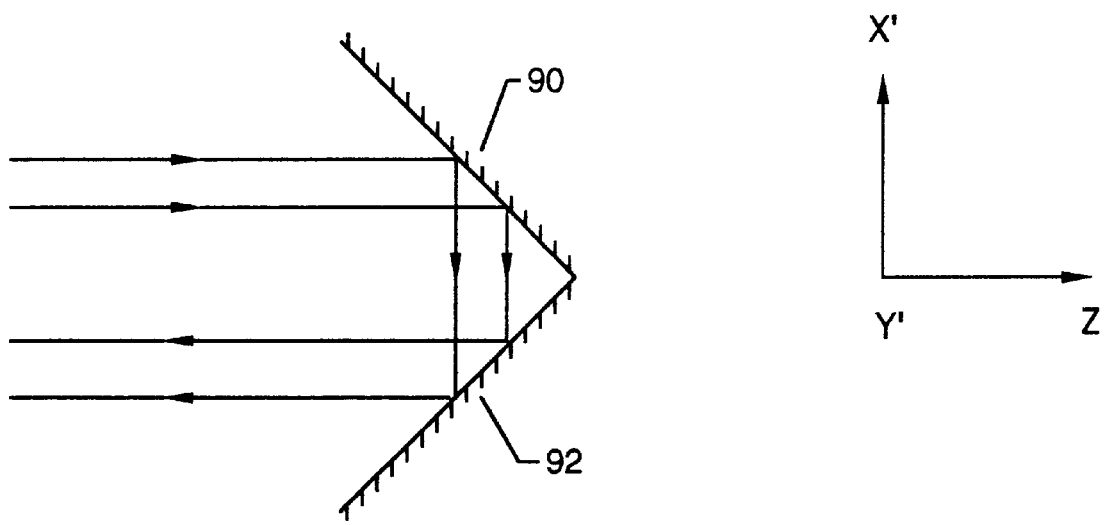

FIGS. 9a and 9b show, in literal form, the image rotation performed by the image rotation device(s) 50. The image is incident on surface 90 at a compound angle of incidence. The image reflected by surface 90 is directed towards surface 92, also being incident at a compound angle of incidence. The two reflections, both at a compound angle of incidence, work to rotate the image by 90 degrees around an axis parallel to the Z-axis.

Figure 10A:
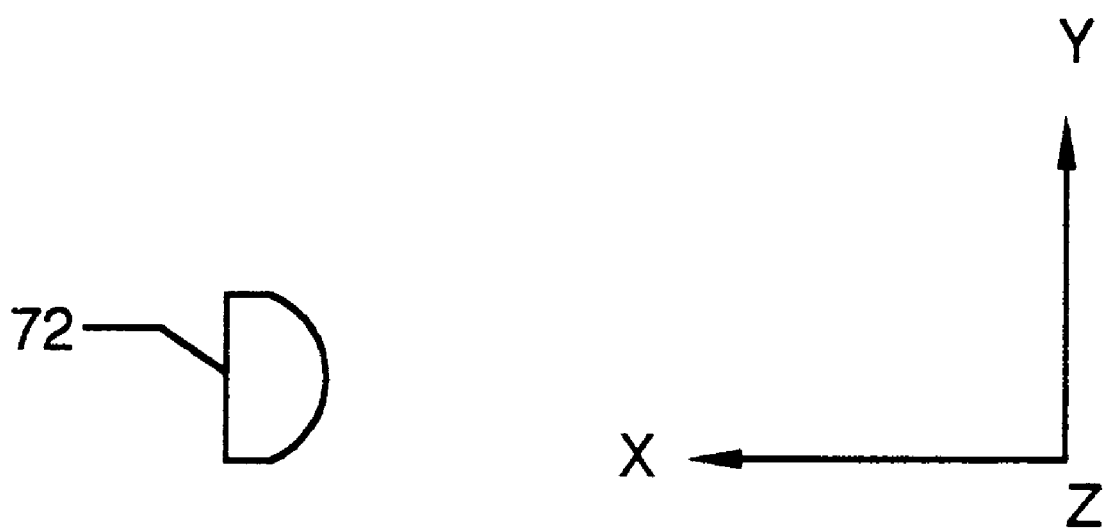
Figure 10B:
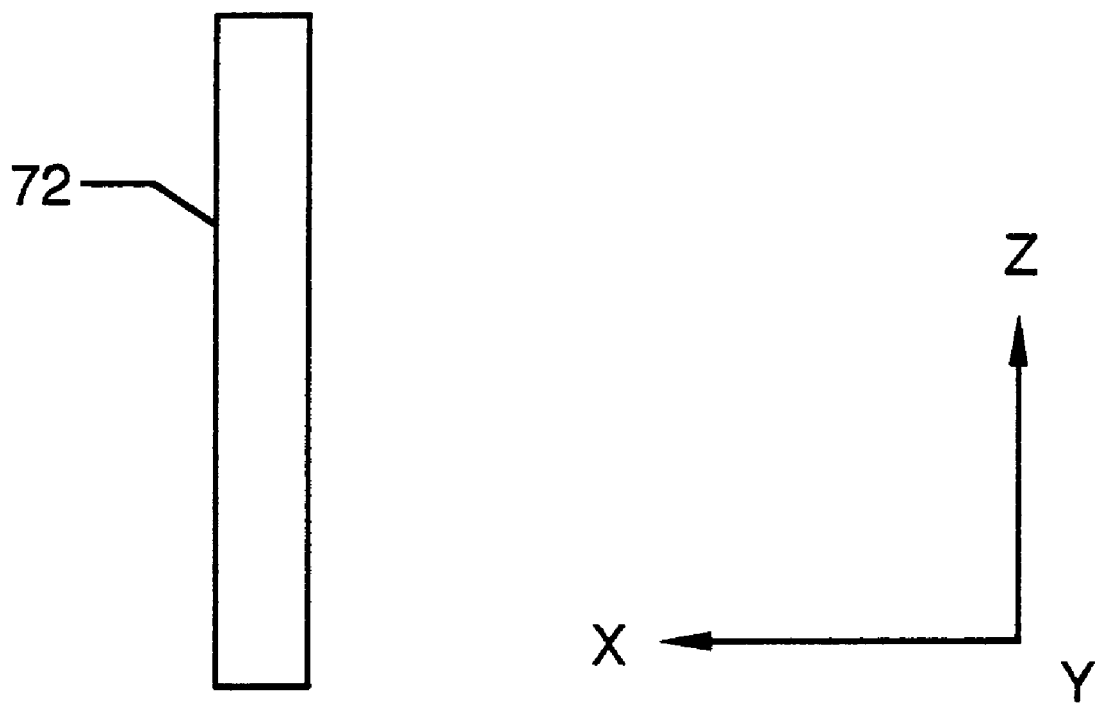

FIG. 10a illustrates an end view of the cylindrical lens 72 and FIG. 10b illustrates a top view of the cylindrical lens 72 which collimates the radiation of the slow axis, where all numerals correspond to those elements previously or otherwise described.

Figure 10C:
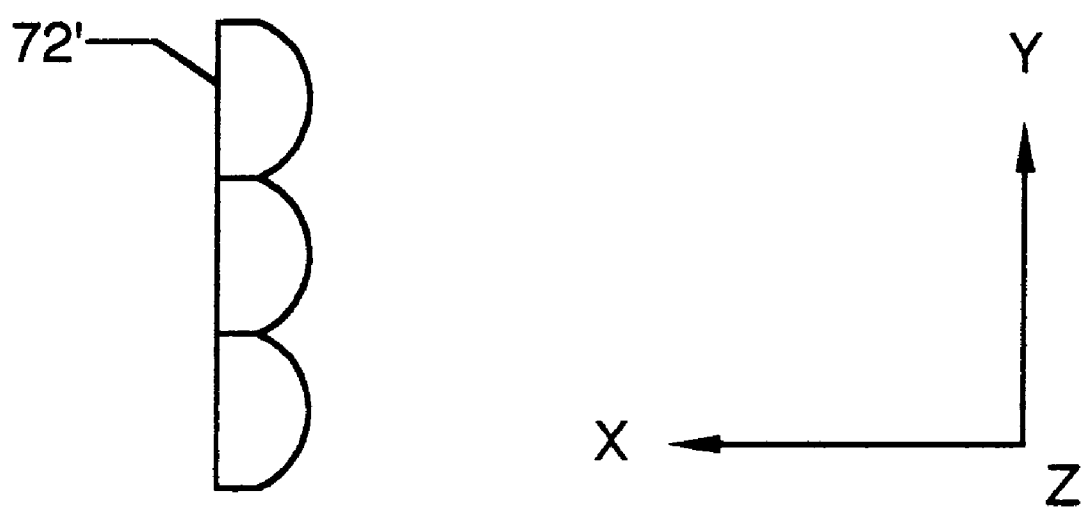
Figure 10D:
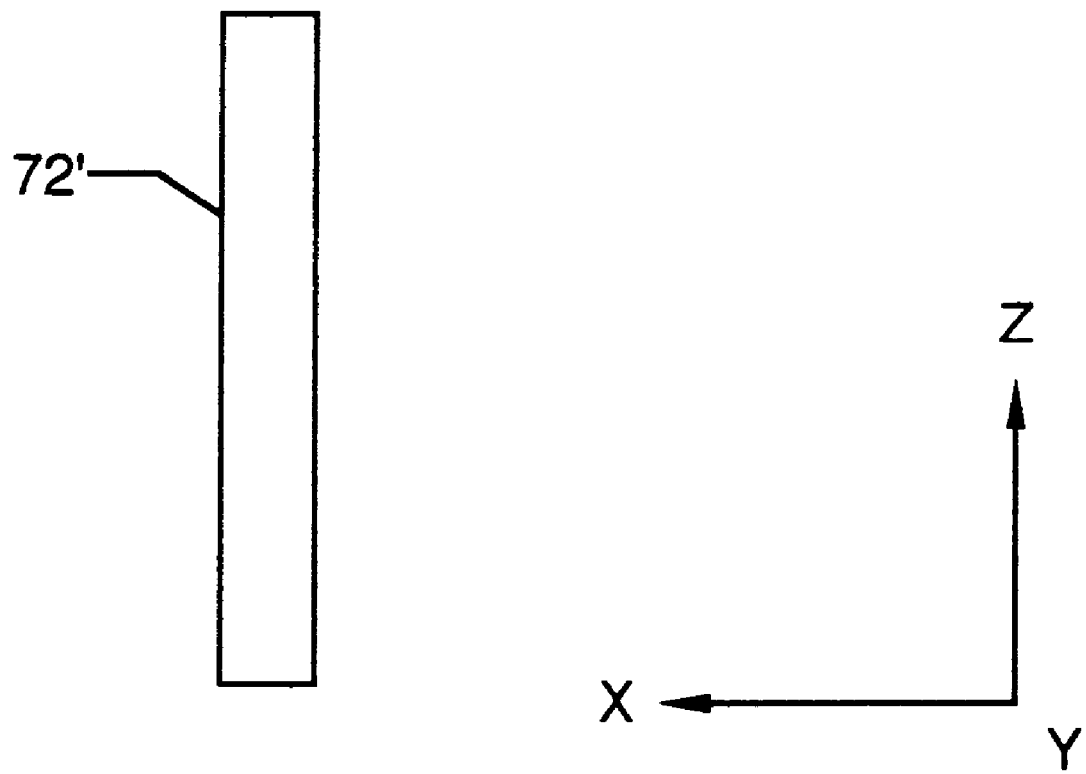

FIG. 10c illustrates an end view of a cylindrical lens array 72' and FIG. 10d illustrates a top view of the cylindrical lens array 72' which collimates the radiation of the slow axis.

MODE OF OPERATION

With reference to FIG. 6, radiation from an array 10 or stacked array 10' of laser diode emitters 12a–12n is collimated in the fast axis by a single cylindrical lens element 20 or by a cylindrical lens array 20. An afocal image relaying optical system 30 then reimages the laser diode emitters 12a–12n, through a polarizing beamsplitter, onto the optical image rotation device 50. The optical image rotation device 50 rotates the image, and therefore the associated polarization, 90 degrees around the Z-axis. The optical image rotation device 50 also reflects and redirects the radiation back towards the polarizing beamsplitter element 40. The polarizing beamsplitter element 40 reflects and redirects the beam in a direction substantially different from the incident beam. A single cylindrical lens element 80 or a cylindrical lens array 20 collimates the beam in the slow axis. Radiation from the laser diode array 10 is then collimated to a high degree of collimation, and can be readily used in many applications.

Various modifications can be made to the present invention without departing from the apparent scope hereof.

It is claimed:

1. A semiconductor laser system for combining the outputs of a plurality of semiconductor laser elements to provide a highly collimated beam, comprising:
   a. a plurality of semiconductor laser sources arranged in a linear pattern, each said source emitting radiation along a first, fast, axis having a relatively higher angular divergence and along a second, slow, axis having a relatively lower angular divergence;
   b. first collimating means positioned to collimate said radiation emitted along said fast axis;
   c. an image relay system positioned to receive said fast axis collimated radiation and to create individual images of said semiconductor laser sources;
   d. an optical image rotation system positioned to receive said individual images and to rotate said images 90 degrees around individual axes parallel to said radiation emitted along said fast and slow axes, and to redirect said rotated images back along the original path;
   e. A polarizing beamsplitter positioned between said image relay system and said optical image rotation system for redirecting said reflected radiation in a direction substantially different from said reflected radiation; and,
   f. second collimating means positioned to collimate said redirected radiation emitted along said slow axis and provide an output beam of radiation collimated along both said fast and slow axes.

2. A system according to claim 1, wherein said first and second collimating means are cylindrical lenses.

\* \* \* \* \*